United States Patent
Ahn et al.

(10) Patent No.: US 9,392,556 B2
(45) Date of Patent: Jul. 12, 2016

(54) APPARATUS AND METHOD FOR REPORTING POWER HEADROOM IN WIRELESS COMMUNICATION SYSTEM

(71) Applicant: LG ELECTRONICS INC., Seoul (KR)

(72) Inventors: Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/415,993

(22) PCT Filed: Jul. 18, 2013

(86) PCT No.: PCT/KR2013/006418
§ 371 (c)(1),
(2) Date: Jan. 20, 2015

(87) PCT Pub. No.: WO2014/014283
PCT Pub. Date: Jan. 23, 2014

(65) Prior Publication Data
US 2015/0215877 A1    Jul. 30, 2015

Related U.S. Application Data

(60) Provisional application No. 61/673,258, filed on Jul. 19, 2012.

(51) Int. Cl.
*H04W 24/10* (2009.01)
*H04W 52/00* (2009.01)
*H04W 52/36* (2009.01)
*H04W 72/04* (2009.01)
*H04W 52/02* (2009.01)
*H04L 5/00* (2006.01)

(52) U.S. Cl.
CPC ........ *H04W 52/365* (2013.01); *H04W 72/0413* (2013.01); *H04L 5/001* (2013.01); *H04W 24/10* (2013.01); *H04W 52/0206* (2013.01)

(58) Field of Classification Search
None
See application file for complete search history.

(56) References Cited

U.S. PATENT DOCUMENTS

| | | |
|---|---|---|
| 2009/0238136 A1 | 9/2009 | Sambhwani et al. |
| 2010/0238863 A1 | 9/2010 | Guo et al. |
| 2014/0029586 A1* | 1/2014 | Loehr ............... H04W 56/0005 370/336 |

FOREIGN PATENT DOCUMENTS

| | | |
|---|---|---|
| KR | 10-2010-0106246 A | 10/2010 |
| KR | 10-2010-0126549 A | 12/2010 |
| KR | 10-2012-0010188 A | 2/2012 |
| KR | 10-2012-0048390 A | 5/2012 |
| WO | WO 2011/050921 A1 | 5/2011 |

* cited by examiner

*Primary Examiner* — Philip Sobutka
(74) *Attorney, Agent, or Firm* — Birch, Stewart, Kolasch & Birch, LLP

(57) ABSTRACT

Provided are an apparatus and a method for reporting a power headroom in a wireless communication system. A terminal may check the configuration of a plurality of subframes for multiple serving cells, determine at least one power headroom (PH) in correspondence to at least one subframe corresponding to the subframe for which an uplink configuration is established, from among the plurality of subframes, and perform a power headroom report (PHR) including said at least one PH.

8 Claims, 12 Drawing Sheets

APPARATUS AND METHOD FOR REPORTING POWER HEADROOM IN WIRELESS COMMUNICATION SYSTEM

CROSS REFERENCE TO RELATED APPLICATION

This application is the National Phase of PCT International Application No. PCT/KR2013/006418, filed Jul. 18, 2013, which claims priority under 35 U.S.C. 119(e) to U.S. Provisional Application No. 61/673,258, filed on Jul. 19, 2012, all of which are hereby expressly incorporated by reference into the present application.

BACKGROUND OF THE INVENTION

1. Field of the Invention

The present invention relates to wireless communications, and more specifically, to an apparatus and method for reporting a power headroom regarding a component carrier in a wireless communication system.

2. Related Art

The LTE (Long Term Evolution) system, a post wireless communication system, has recently taken its step into the business world. The state-of-art communication system is rapidly spreading with the increasing demand for support of high-quality voice and mass data services while ensuring users' mobility. This next-generation system offers low transmission delay, high transmission rate and system capacity, and increased coverage.

To the end, the LTE system adopts carrier aggregation (CA). Carrier aggregation is also referred to as spectrum aggregation or bandwidth aggregation, and this scheme aggregates multiple component carriers to enable broadband transmission and reception of data. Each aggregated carrier is referred to as a component carrier (CC). Each component carrier is defined with a bandwidth and a center frequency.

For a high transmission rate, communication services require an increased bandwidth. In the case of low QoS services, allocation of a large bandwidth to them may cause a huge power waste. Meanwhile, base stations may make efficient use of resources of a user equipment (UE) with the power information from the UE. Power control is a core technique for base stations to reduce the UE's power consumption while minimizing interference for an efficient resource distribution. To that end, the UE may determine uplink transmission power depending on scheduling information provided from the UE to base stations, such as bandwidth, modulation and coding scheme (MCS), or transmit power control (TPC).

Adoption of multiple component carriers requires comprehensive consideration of uplink transmit power of each component carrier, and the UE's power control is thus encountered with more complicated situations. This may put the UE at issues in light of maximum transmit power. A maximum transmit power refers to the upper cap within an allowable transmit power range of a UE. Typically, a UE should be operated at lower power than its maximum transmit power. In case a schedule prepared by a base station requires a UE to use a higher transmit power than the UE's maximum transmit power, the actual uplink transmit power may exceed the maximum transmit power.

Accordingly, the information on the uplink transmit power needs to be shared between the UE and the base station. In particular, a need exists for a delicate signaling scheme for a power headroom in order to efficiently adjust transmit power.

SUMMARY OF THE INVENTION

The present invention provides an apparatus and method for reporting a power headroom regarding a component carrier in a wireless communication system.

Further, the present invention provides an apparatus and method for configuring power information regarding multiple component carriers in a wireless communication system.

Further, the present invention provides an apparatus and method for configuring a power headroom reporting message in a wireless communication system supporting a multi-component carriers.

Further, the present invention provides an apparatus and method for configuring and reporting a power headroom regarding a serving cell in which an uplink configuration is established in a wireless communication system.

According to an embodiment of the present invention, a method for reporting a power headroom by a user equipment (UE) in a wireless communication system comprises determining configurations of a plurality of sub-frames for a plurality of serving cells, determining at least one power headroom (PH) corresponding to at least one sub-frame for which an uplink configuration is established among the plurality of sub-frames, and generating and transmitting a power headroom report (PHR) including the at least one PH.

According to the present invention, generating and transmitting the PHR includes excluding at least one PH corresponding to at least one sub-frame for which a downlink configuration is established among the plurality of sub-frames.

According to another embodiment of the present invention, an apparatus for reporting a power headroom in a wireless communication system comprises an RF (Radio Frequency) unit transmitting and receiving a radio signal and a processor connected with the RF unit, the processor determines configurations of a plurality of sub-frames for a plurality of serving cells, determines at least one power headroom (PH) corresponding to at least one sub-frame for which an uplink configuration is established among the plurality of sub-frames, and generates and transmits a power headroom report (PHR) including the at least one PH.

The base station may identify the transmit power for at least one serving cell where an uplink transmission configuration is established from the UE, and thus, the base station may exactly grasp available transmit power that may be put in actual use for uplink transmission. Further, optimized power headroom reporting is possible, thus simplifying the message configuration and computation for a power headroom report. Accordingly, limited uplink resources may be put in efficient use.

Further, in the CA-supportive wireless communication system, the UE may be rendered to provide exact power information on at least one component carrier having uplink transmission, enabling configuration of a power headroom report without any resource waste in the MAC control element. Therefore, the MAC message may be optimized, and the transmit power scheduling of the base station may be more efficiently achieved.

DETAILED DESCRIPTION OF EXEMPLARY EMBODIMENTS

Hereinafter, some embodiments of the present invention are described in detail with reference to the accompanying drawings. The same reference denotations are used to refer to the same or substantially the same elements throughout the specification and the drawings. When determined to make the subject matter of the present invention unclear, the detailed description of known configurations or functions is omitted.

The description of the disclosure targets communication networks. The task by a communication network may be done while a system (e.g., a base station) in charge of the communication network controls the network and performs data transmission, or such task may be conducted by a user equipment linked with the network.

Figure 1:
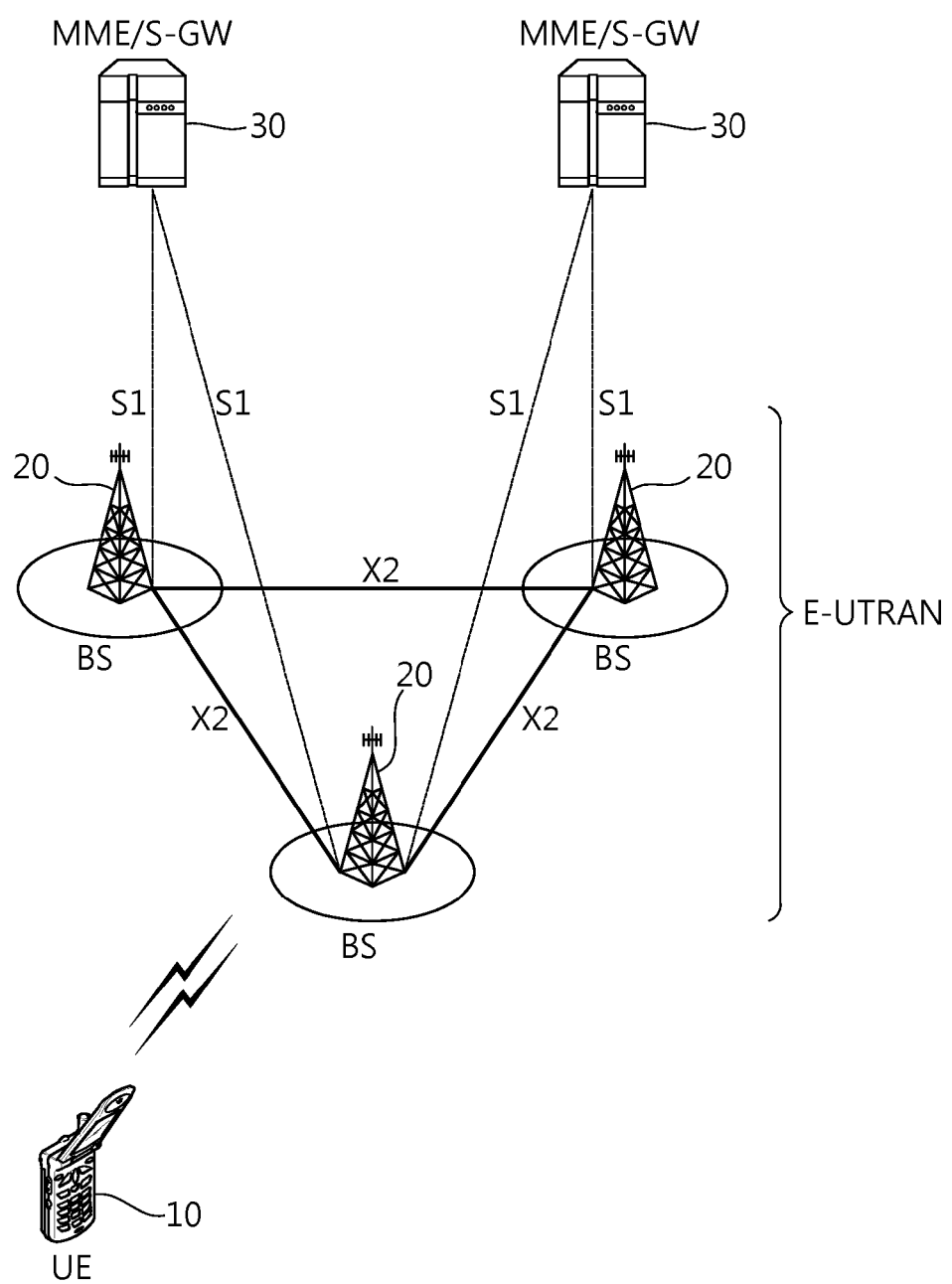
FIG. 1 illustrates a wireless communication system to which the present invention applies.

FIG. 1 illustrates a wireless communication system to which the present invention applies. The wireless communication system is also referred to as an E-UTRAN (Evolved-UMTS Terrestrial Radio Access Network) or an LTE (Long Term Evolution)/LTE-A system. Such system is a packet-based system for providing various communication services such as voice or packet data services.

The E-UTRAN includes a base station (BS) 20 that provides a control plane and a user plane to a user equipment (UE) 10. The UE 10 may be a stationary or mobile device, and the UE 10 may be referred to as an MS (Mobile Station), a UT (User Terminal), an SS (Subscriber Station), an MT (Mobile Terminal), or a wireless device. The base station (BS) generally denotes a fixed station that communicates with the UE 10, and the base station (BS) 20 may be referred to as an eNB (evolved-NodeB), a BTS (Base Transceiver System), or an access point. The term "cell" should be interpreted in a comprehensive concept representing a partial region covered by the base station 20, and the term "cell" collectively means various coverage regions including a mega cell, a macro cell, a micro cell, a pico cell, and a femto cell.

Hereinafter, the term "downlink" means a communication from the base station 20 to the UE 10, and the term "uplink" means a communication from the UE 10 to the base station 20. For the downlink, a transmitter may be part of the base station 20, and a receiver may be part of the UE 10. For the uplink, a transmitter may be part of the UE 10, and a receiver may be part of the base station 20.

Various multiple access schemes, without limited thereto, may apply to the wireless communication system according to the present invention. The multiple access schemes may include, but is not limited to, CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, and OFDM-CDMA. For uplink transmission and downlink transmission, TDD (Time Division Duplex) in which the uplink transmission and the downlink transmission are conducted in different times and FDD (Frequency Division Duplex) in which the uplink transmission and the downlink transmission are performed at different frequencies may be adopted.

Base stations 20 may be connected with each other via an X2 interface. Each base station 20 is connected via an S1 interface with an EPC (Evolved Packet Core) 30. Specifically, the base stations 20 are connected with an MME (Mobility Management Entity) via S1-MMEs and with an S-GW (Serving Gateway) via S1-Us. Here, the MME hosts control plane functions, and the S-GW hosts user plane functions.

The EPCs 30 include the MME, the S-GW, and a P-GW (Packet Data Network-Gateway). The MME contains information regarding the capability of the 10 or access information, and such information is used for managing mobility of the UE 10. The S-GW is a gateway having an E-UTRAn as its end point, and the P-GW is a gateway having a PDN (Packet Data Network) as its end point.

The radio interface protocol layers between the terminal and the network may be divided into an L1 layer (first layer), an L2 layer (second layer), and an L3 layer (third layer) based on the three lowermost layers of the OSI (Open System Interconnection) reference model that is well known in the communication system industry. Among them, the physical layer belonging to the first layer provides an information transfer service using the physical channel, and the RRC (Radio Resource Control) layer positioned in the third layer controls radio resources between the terminal and the network. To that end, the RRC layer exchanges RRC messages between the terminal and the network.

Figure 2:
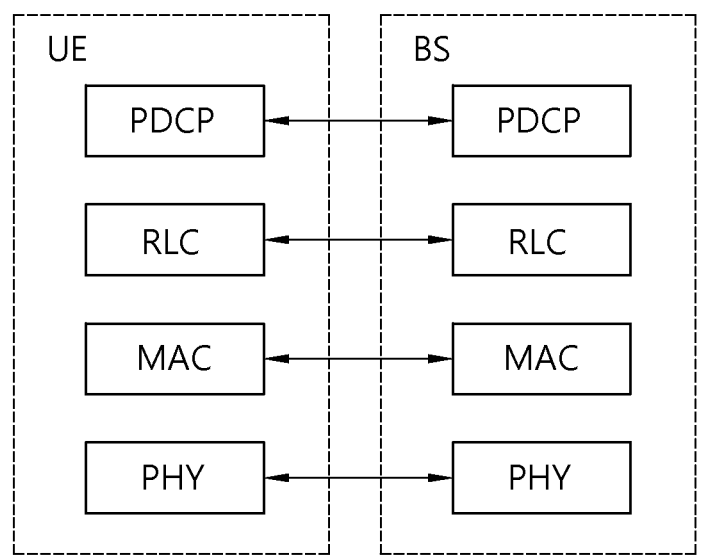
FIG. 2 is a block diagram illustrating a radio protocol architecture for a user plane to which the present invention applies.
Figure 3:
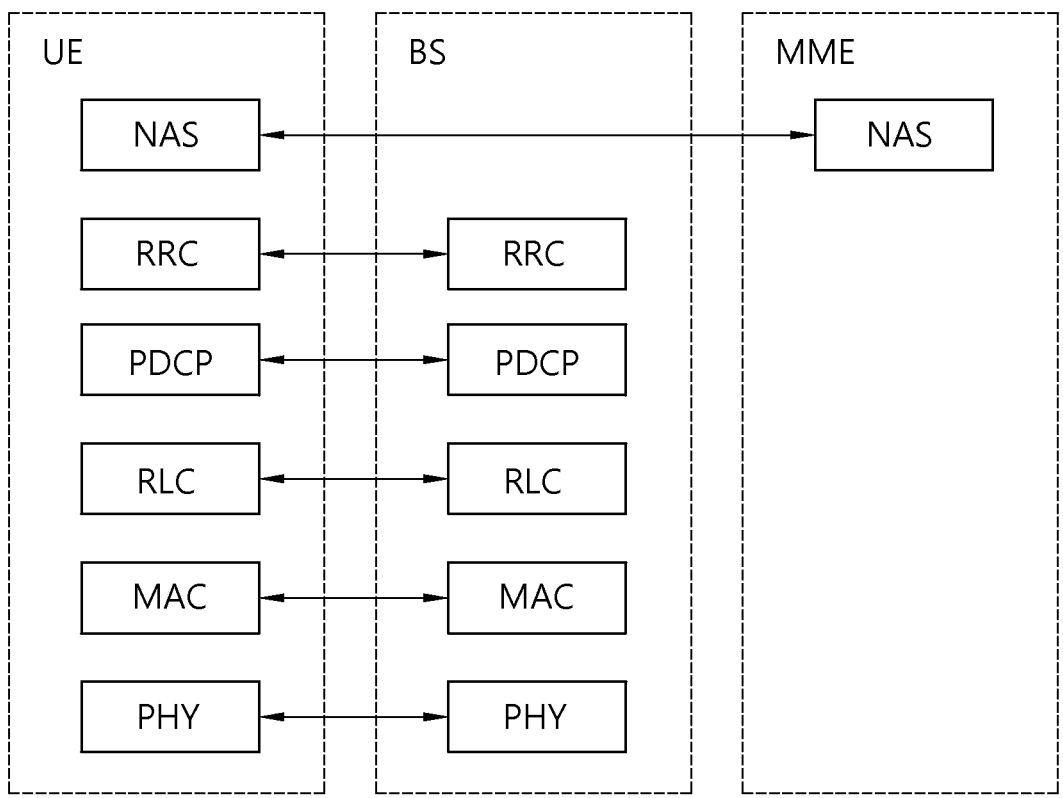
FIG. 3 is a block diagram illustrating a radio protocol architecture for a control plane to which the present invention applies.

FIG. 2 is a block diagram illustrating a radio protocol architecture for a user plane to which the present invention applies. FIG. 3 is a block diagram illustrating a radio protocol architecture for a control plane to which the present invention applies. The user plane is a protocol stack for transmission of user data, and the control plane is a protocol stack for transmission of control signals.

Referring to FIGS. 2 and 3, the physical (PHY) layers 210 and 310 provide an information transfer service to higher layers using their respective physical channels. The physical layers are connected with the higher layers, medium access control (MAC) layers 220 and 230, via transport channels. Data travels between the MAC layers and the physical layers via the transport channels. The transport channels are classified depending on the way and the characteristics by which data is transmitted through the radio interfaces.

Data moves through the physical channels between different physical layers, e.g., between the physical layer of the transmitter and the physical layer of the receiver. The physical channels may be modulated by an OFDM (Orthogonal Frequency Division Multiplexing) scheme, and the physical channel utilize times and frequencies as radio resources.

The functions of the MAC layer 220 include mapping between the logical channel and the transport channel and multiplexing/demultiplexing of the MAC SDU (Service Data Unit) belonging to the logical channel into a transport block provided to the physical channel on the transport channel. The MAC layers provide services to RLC (Radio Link Control) layers 230 and 330 through the logical channels.

The functions of the RLC layer 230 include concatenation, segmentation, and reassembly of RLC SDUs. To ensure various QoSs (Quality of Services) required by radio bearers (RBs), the RLC layers offer three operation modes such as transparent mode (TM), unacknowledged mode (UM), and acknowledged mode (AM). The AM RLC provides error correction through an ARQ (Automatic Repeat Request).

The functions of PDCP (Packet Data Convergence Protocols) layers 240 and 340 in the user plane include transfer, header compression, and ciphering of user data. The functions of the PDCP layers in the control plane include transfer, ciphering and integrity protection of control plane data.

The radio resource control (RRC) layer 350 is defined in the control plane alone. The RRC layer 350 is in charge of the control of logical channels, transport channels, and physical channels in association with configuration, reconfiguration, and release of radio bearers. The RBs mean logical paths provided by the first layer (PHY layer) and the second layers (MAC layer, RLC layer, and PDCP layer) for transfer of data between the UE and the network.

An RB being configured means a process of specifying the characteristics of radio protocol layers and channels and setting up the respective specific parameters thereof in order to provide a specific service. The RBs may be classified into SRBs (Signaling RBs) and DRBs (Data RBs). The SRBs are used as paths for transmitting RRC messages and NAS messages in the control plane, and the DRBs are used as paths for transmitting user data in the user plane.

In case there is an RRC connection between the RRC layer of the UE and the RRC layer of the E-UTRAN, the UE is left in an RRC connected state (also referred to as RRC connected mode), and otherwise, the UE is left in an RRC idle state (also referred to as RRC idle mode). Some physical channels are present.

The NAS (Non-Access Stratum) control protocol 360 is terminated by the MME at the side of the network to conduct EPS bearer management, authentication, and ciphering control.

Data is transmitted from the network to the UE through downlink transport channels. As an example, the downlink transport channels include a broadcast channel (BCH) for transmitting system information and a downlink common channel (SCH) for transmitting user traffic or control messages. User traffic or control messages for downlink multicast or broadcast services may be transmitted through a downlink SCH or additionally via a downlink multicast channel (MCH). Also data may be transmitted from the UE to the network through uplink transmission. By way of example, the uplink transport channels include a random access channel (RACH) for transmitting initial control messages and an uplink SCH for transmitting user traffic or control messages.

Examples of logical channels that are higher channels of the transport channels, mapped with the transport channels, include a broadcast channel (BCCH), a paging channel (PCCH), a common control channel (CCCH), a multicast control channel (MCCH), and a multicast traffic channel (MTCH).

The physical channels include multiple OFDM symbols in the time domain and multiple sub-carriers in the frequency domain. One sub-frame includes multiple OFDM symbols on time axis. A resource block is the unit for resource allocation, and the resource block includes multiple OFDM symbols and sub-carriers. Additionally, each sub-frame uses a specific OFDM symbol (e.g., first symbol) of the sub-frame for the physical downlink control channel (PDCCH), e.g., an L1/L2 control channel. The transmission time interval (TTI) is the temporal unit of sub-frame transmission.

Figure 4:
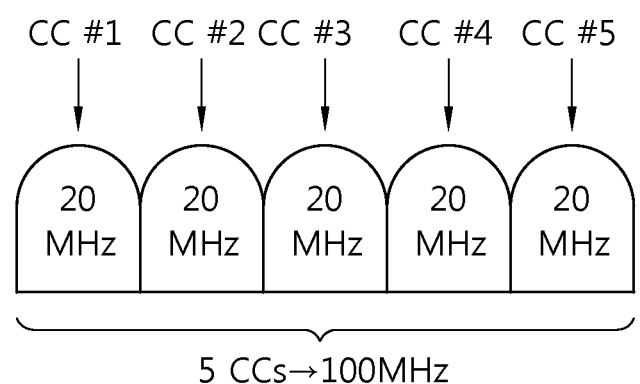
FIG. 4 illustrates an example of a multi-component carrier to which the present invention applies.

FIG. 4 is a view schematically illustrating a definition of carrier aggregation (CA) to which the present invention applies.

Referring to FIG. 4, carrier aggregation schemes may be classified into a contiguous carrier aggregation scheme that is performed between contiguous component carriers in the frequency domain and a non-contiguous carrier aggregation scheme that is performed between non-contiguous component carriers in the frequency domain. The number of carriers aggregated may differ between downlink and uplink. When the number of carriers aggregated on downlink is the same as the number of carriers aggregated on uplink is referred to as symmetric carrier aggregation, and when the two numbers differ from each other is referred to as asymmetric carrier aggregation. The multi-carrier system may adopt either or both of contiguous carrier aggregation and/or non-contiguous carrier aggregation. Further, the component carriers may differ in size (i.e., bandwidth) from each other.

Described is an example in which five CCs, e.g., CC #1, CC #2, CC #3, CC #4, and CC #5, each having a bandwidth of 20 MHz, are present. As in such example, a granularity of five CCs each with a bandwidth of 20 MHz, a bandwidth up to 100 MHz may be supported. Here, the bandwidth or number of CCs is a mere example. Further, the number of downlink CCs may be identical to the number of uplink CCs.

Further, the component carriers may be classified into fully configured component carriers and partially configured component carriers. The fully configured component carriers refer to bidirectional component carriers that allow for transmission and/or reception of all control signals and data, and the partially configured component carriers refer to unidirectional component carriers that allow for transmission of downlink data only. The partially configured component carriers may be primarily used in MBSs (Multicast and Broadcast Services) and/or SFNs (Single Frequency Networks).

As described above, the MAC layer may operate one or more CCs. The MAC layer may include one or more HARQ entities. One HARQ entity may conduct an HARQ for a single CC. Each HARQ entity may independently process a transport block on a transport channel. Thus, the plurality of HARQ entities may transmit or receive a plurality of transport blocks through a plurality of CCs.

One CC (or a pair of downlink CC and uplink CC) may correspond to one cell. When a synchronization signal and system information are provided using each downlink CC, the downlink CC may correspond to one serving cell. If the UE receives a service using a plurality of downlink CCs, the UE may be said to receive the service from a plurality of serving cells. Further, the base station may provide a plurality of serving cells to the UE using a plurality of downlink CCs. Accordingly, the base station and the UE may communicate with each other using a plurality of serving cells.

Here, the serving cells may be classified into a primary serving cell and secondary serving cells. The primary serving cell always remains activated and operates at a primary frequency. The primary serving cell initiates an RRC connection establishment or re-establishment procedure of the UE, and the primary serving cell provides a security input and NAS mobility information. The serving cells may be activated or deactivated and operate at secondary frequencies. The secondary serving cells, when an RRC connection is established, may be configured, and are used to provide additional radio resources. The primary serving cell may be configured in a pair of downlink CC and an uplink CC, and each secondary serving cell may be configured in a pair of downlink CC and an uplink CC or with a downlink CC only.

As described supra, the UE may have a single primary serving cell or one primary serving cell and at least one or more secondary serving cells in its serving cell set depending on its capabilities.

A power headroom (PH) is now described.

The power headroom means extra power that may be used in addition to the power currently used by the UE for uplink transmission. For example, assume that the allowable transmit power cap, i.e., maximum transmit power, of the UE is 10 W. Also, assume that the UE presently uses 9 W in a frequency band of 10 MHz. The UE may additionally use 1 W that is extra power. Under such circumstance, if the base station assigns a frequency band of 20 MHz to the UE, the UE needs 9 W (power consumed in the frequency band of 10 MHz) X2=18 W.

However, since the UE is limited to a maximum power of 10 W, assignment of 20 MHz to the UE would disable the UE from using the whole frequency band or leave the UE with insufficient power, rendering it difficult for the base station to properly receive signals from the UE.

To address such issues, the UE sends, to the base station, a report indicating the extra power is 1 W, and the base station controls the transmit power that scheduling may be done within the extra power range considering the extra power of the UE. Such report is referred to as a power headroom report (PHR). In other words, the power headroom means power available by the UE in addition to the power that is currently put in use. The power headroom may denote a difference between the UE's maximum transmit power and the transmit power currently being used.

As described above, the power headroom report is used to explicitly inform the base station of the difference between the UE's maximum transmit power and power estimated for UL-SCH transmission. The following Equation 1 defines a power headroom in sub-frame i.

$$PH(i)=P_{CMAX}-\{10\log_{10}(M_{PUSCH}(i))+P_{O\_PUSCH}(j)+\alpha(j)PL+\Delta_{TF}(i)+f(i)\}$$ [Equation 1]

where, $P_{CMAX}$ is the maximum transmit power configured in the UE, $M_{PUSCH}(i)$ is the bandwidth of a PUSCH resource allocation represented as the number of resource blocks in sub-frame i, PL is a DL path loss estimation computed by the UE, and $P_{O\_PUSCH}(j)$, $\alpha(j)$, $\Delta_{TF}(i)$ and $f(i)$ are parameters obtained from higher layer signaling.

Meanwhile, the PHR may be triggered as follows:
When the UE has a UL resource for new transmission, and when the prohibit timer expires, the transmission is PHR transmission, and the path loss is varied with a value larger than a path loss threshold, When the periodic timer expires,
Configuration and re-configuration for a PHR function
If the UE is assigned with a resource for new transmission within the TTI:
If the resource is the first UL resource for new transmission after the last MAC reset, the periodic timer initiates;

If after the last transmission of the PHR, the PHR is triggered at least once, and this is the first triggered PHR, and;
If the assigned UL resource may receive a PHT MAC control element as a result of LCR (Logical Channel Prioritization):
obtain a power headroom value from the physical layer;
instruct creation and transmission of a PHR MAC control element based on the value reported from the physical layer;
initiate or re-initiate the periodic timer;
initiate or re-initiate the prohibit timer;
cancel all triggered PHRs.

The power headroom is transmitted with an MAC CE (Control Element).

In order to trigger the power headroom report, the RRC controls the power headroom report by setting the two timers (periodic timer and prohibit timer) and the path loss threshold for setting a variation in the measured DL path loss. Here, the estimated path loss value is measured by the UE based on RSRP (Reference Symbol Received Power).

Figure 5:
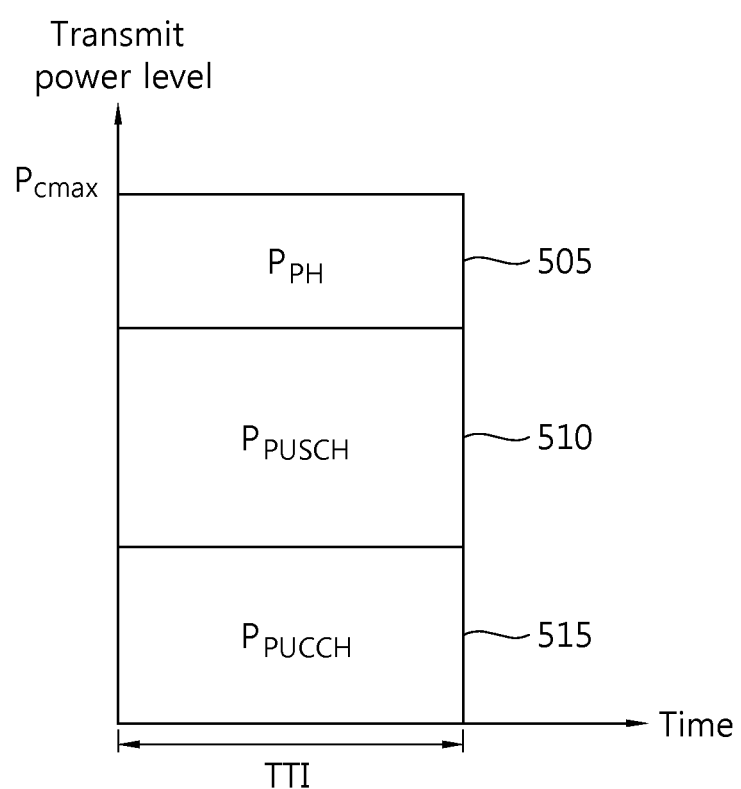
FIG. 5 is a view schematically illustrating the concept of uplink transmit power to which the present invention applies.

FIG. 5 is a view schematically illustrating the concept of a power headroom to which the present invention applied.

Referring to FIG. 5, the maximum transmit power $P_{cmax}$ configured in the UE includes $P_{PH}$ 505, $P_{PUSCH}$ 510, and $P_{PUCCH}$. That is, the remainder of $P_{cmax}$ except $P_{PUSCH}$ 510 and $P_{PUCCH}$ 515 is defined as $P_{PH}$ 505. Each power is computed at each transmission time interval (TTI). That is, the extra power (PH) is defined as a difference between the UE's set maximum transmit power $P_{cmax}$ and the power estimated regarding the uplink transmission, $P_{estimated}$, as shown in Equation 2, and its unit is dB.

$$P_{PH}=P_{cmax}-P_{estimated}\,[\text{dB}]$$ [Equation 2]

Here, the extra power ($Pp_{PH}$) may also be referred to as power headroom (PH), remaining power, or surplus power. In other words, the remaining value of the maximum transmit power configured in the UE by the base station, except the sum ($P_{estimated}$) of the transmit powers respectively used by the component carriers is $P_{PH}$.

As an example, $P_{estimated}$ is equal to the power, $P_{PUSCH}$, estimated regarding the transmission of a physical uplink shared channel (PUSCH). Accordingly, in such case, $P_{PH}$ may be obtained by Equation 3. Equation 3 applies to only when PUSCH is transmitted on uplink, which is referred to as Type 1. The extra power according to Type 1 is referred to as Type 1 extra power.

$$P_{PH}=P_{cmax}-P_{PUSCH}\,[\text{dB}]$$ [Equation 3]

As an example, $P_{estimated}$ equal to the sum of the power, $P_{PUSCH}$, estimated regarding the transmission of a PUSCH and the power, $P_{PUCCH}$, estimated regarding the transmission of a physical uplink control channel (PUCCH). According, in such case, the extra power may be obtained by Equation 4. Equation 4 applies to when the PUSCH and the PUCCH are simultaneously transmitted on uplink, which is referred to as Type 2. The extra power according to Type 2 is referred to as Type 2 extra power.

$$P_{PH}=P_{cmax}-P_{PUCCH}-P_{PUSCH}\,[\text{dB}]$$ [Equation 4]

The extra power according to Equation 4 may be represented as a graph on time-frequency axes as shown in FIG. 5. For ease of description, FIG. 5 illustrates the extra power for a single CC.

Figure 6:
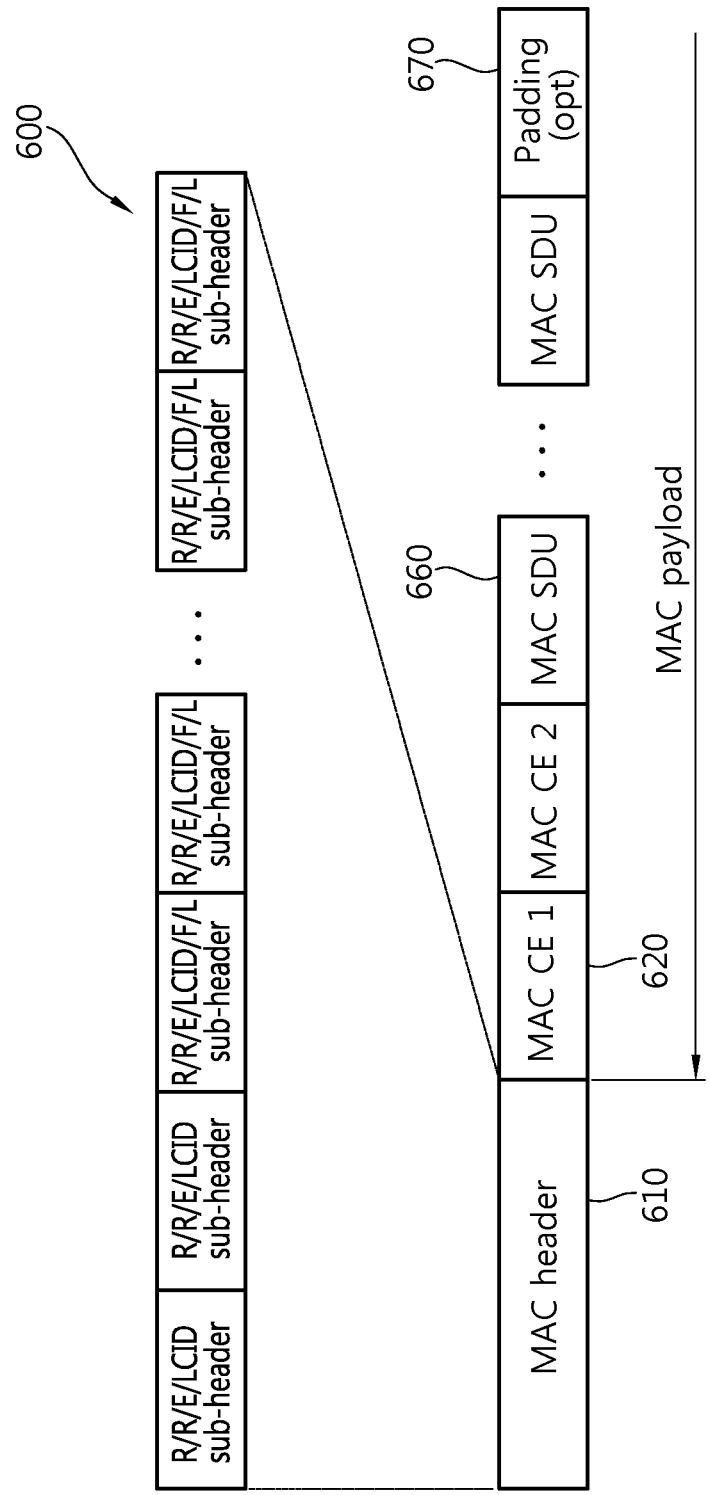
FIG. 6 illustrates the structure of an MAC PDU for power reporting to which the present invention applies.

FIG. 6 illustrates the structure of an MAC PDU for a power headroom report to which the present invention applies.

Referring to FIG. 6, the MAC PDU 600 includes an MAC header 610, at least one MAC control elements 620, ..., 62n, at least one MAC SDU (Service Data Unit) 660, ..., 66m, and a padding 670. The MAC control element 620 is a control message generated by the MAC layer. The MAC SDU 660 is the same as the RLC PDU transferred from the RLC (Radio Link Control) layer. The padding 670 includes a predetermined number of bits added to make the size of the MAC PDU even. The MAC control element 620, the MAC SDU 660, and the padding 670 are collectively referred to as MAC payload.

The MAC header 610 includes at least one sub-header 610-1, 610-2, ..., 610-k, and each sub-header equally corresponds in order to one MAC SDU, one MAC control element, or padding. Each sub-header 610 may include four fields respectively denoted R, R, E, and LCID or six fields respectively denoted R, R, E, LCID, F, and L. The sub-header including four fields corresponds to the MAC control element or padding, and the sub-frame including six fields corresponds to the MAC SDU.

Meanwhile, the fields of each sub-header are described below.
- R (one bit): reserved field.
- E (one bit): extended field. Whether there is an F or L field is indicated by the following fields.
- LCID (five fields): logical channel ID field. Indicate the logical channel where an MAC SDU belongs or the type of an MAC CE.
- F (one bit): format field. Indicate whether a following L field includes seven fields or 15 fields.
- L (7 or 15 bits): length field. Indicate the length of the MAC CE or MAC SDU corresponding to an MAC sub-header.

The F and L fields are not included in the MAC sub-header corresponding to the MAC CE of a fixed size.

That is, the LCID field is a field for identifying the logical channel corresponding to the MAC SDU or for identifying the type of MAC control element or padding, and the LCID field may include five bits. According to an embodiment of the present invention, the value of the LCID may be set to 11010 or 11001 for an extra power report as shown in Table 1:

TABLE 1

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |

In the LTE system to which the present invention applies, the plurality of TDD cells carrier-aggregated by one UE typically have the same U/D (uplink-downlink or UL/DL) configuration frame structure.

Regarding this, Table 2 shows an exemplary TDD uplink/downlink configuration of a radio frame. The TDD uplink/downlink configuration defines a sub-frame reserved for uplink transmission and a sub-frame reserved for downlink transmission in one TDD radio frame. That is, the TDD uplink/downlink configuration indicates the rule by which uplink and downlink are allocated (or reserved) to each sub-frame in one TDD radio frame. D denotes when a sub-frame is used for downlink transmission, and U denotes when a sub-frame is used for uplink transmission. S is a special sub-frame and indicates that a sub-frame is used for a special purpose, e.g., for frame sync or for downlink transmission.

That is, the TDD cells are synced in U/D timing, and the plurality of TDD cells aggregated by the UE are all at U (Up) sub-frame timing or D (Down) sub-frame timing.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Further, the TDD uplink/downlink configuration shown in Table 2 may be transmitted from the base station to the terminal through system information. The base station may inform the UE of a variation in the uplink-downlink allocation state of the radio frame by transmitting only the index of the TDD uplink/downlink configuration whenever the TDD uplink/downlink configuration varies. Or, the TDD uplink/downlink configuration may be control information commonly transmitted as broadcast information to all the UEs in the cell through broadcast channels.

In such communication environment, it may be taken into account for post systems to make a plurality of cells aggregated by one UE come up with different U/D configurations so that U sub-frames and D sub-frames are mixed up at the same timing for the plurality of cells in order to maximize the overall data capacity in consideration of the interference environment or U/D data traffic environment that differs per cell. The carrier aggregation of cells configured with different types of U/D TDD may be easy to implement particularly when the cells belong to different bands because there is relatively less interference between UL transmission signals and DL transmission signals.

Meanwhile, the UE aggregating a plurality of cells needs a scheme for effectively transmitting a PHR for each cell to the base station in any sub-frame when the U/D configuration varies per cell. That is, the UE is required to specify PHRs for activated cells that are to be aggregated by the UE.

Figure 7:
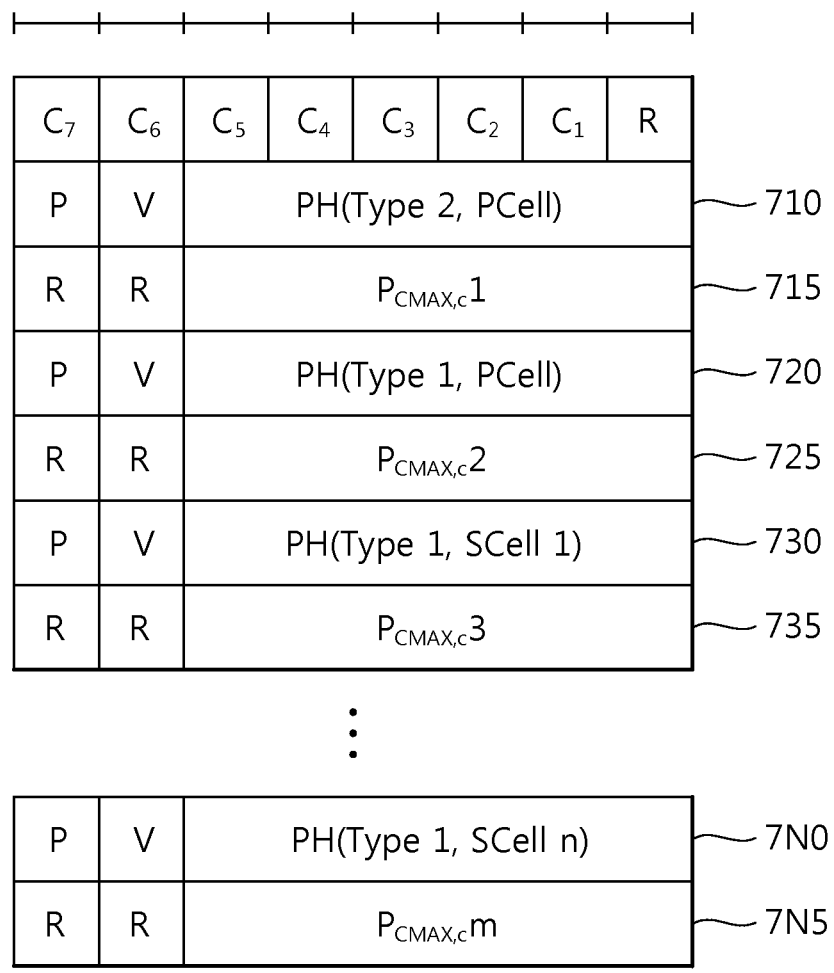
FIG. 7 illustrates an example of an MAC CE for power reporting to which the present invention applies.

FIG. 7 shows an exemplary MAC CE for a PHR in a wireless communication system to which the present invention applies.

Referring to FIG. 7, the MAC CE for a PHR may be identified by an MAC PDU sub-header having an LCID corresponding to the MAC CE of the PHR. The MAC CE may include octets of respective PHs of the serving cells and respective related $P_{CMAX,c}$'s of the serving cells. The respective cell indexes and related $P_{CMAX,c}$'s of the serving cells may be included in descending order.

The fields in the PHR may be defined as follows:
- Ci: This indicates whether there is a PH for the serving cell of cell index i. If the Ci field is set to '1,' the PH for the serving cell of cell index i is reported. If the Ci field is set to '0,' the PH for the serving cell of cell index i is not reported.
- R: reserved bit set to '0.'
- V: This indicates whether a PH value is actually transmitted or is transmitted with a reference format. V=0 indicates the presence of related $P_{CMAX,c}$, and V=1 indicates the absence of related $P_{CMAX,c}$.

PHLn: This indicates the PHL (Power Headroom Level) for an nth serving cell. n=1, . . . N. n=1 for primary serving cells, and n=2, . . . , N for secondary serving cells not less than 0. Each PHL indicates a corresponding PH value.

P: This indicates whether the UE applies power backoff due to power management. Unless power backoff applies due to power management, in case a corresponding $P_{CMAX,c}$ has a different value, P=1.

$P_{CMAX,c}$: If any, the TP (transmit power) field includes the $P_{CMAX,c}$ used for calculation of a previous PH.

Here, the $P_{CMAX,c}$ may be set to one of the values shown in Table 3, and the set value may be transmitted. Assume that an example of the $P_{CMAX,c}$ is a power level for an extended PHR.

TABLE 3

| $P_{CMAX,c}$ | Nominal UE transmit power level |
| --- | --- |
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

In this case, the UE transmits only Type 1 PHRs for each cell or both Type 1 PHRs and Type 2 PHRs depending on settings of the base station. In particular, Type 2 PHRs are transmitted only for PCells.

In the case of Type 1 PHRs, the UE transmits PH (power headroom) values 720, 730, . . . , 7N0 obtained by subtracting, from the maximum allowable power $P_{CMAX,c}$ in the corresponding cell, the transmit power to be applied if the PUSCH is transmitted in the corresponding cell. Further, in case the UE actually transmits the PUSCH in the corresponding cell, the UE also transmits the $P_{CMAX,c}$ values 725, 735, . . . , 7N5. Here, the reason why the UE also transmits the $P_{CMAX,c}$ value for the PUSCH is that in case the UE actually transmits the PUSCH, the $P_{CMAX,c}$ value may be adjusted according to transmission aspects of the PUSCH (e.g., transmission bandwidth, transmission position, RB count, modulation order) and that the base station cannot be exactly aware of the UE's current transmit power only with the PH value and without the $P_{CMAX,c}$ value applied by the UE.

On the other hand, in the case of Type 2 PHRs, the UE transmits a PH value obtained by subtracting, from the maximum allowable power $P_{CMAX,c}$ in the corresponding cell, the overall transmit power to be applied if the PUSCH and the PUCCH are simultaneously transmitted in the corresponding cell. Further, in case the UE actually transmits the PUCCH in the corresponding cell, the UE also transmits the Pcmax,c value 715. Here, the reason why the UE also transmits the $P_{CMAX,c}$ value for the PUCCH is that in case the UE actually transmits the PUCCH, the UE may adjust the $P_{CMAX,c}$ value according to transmission aspects of the PUCCH, and in such case, the base station cannot be exactly aware of the UE's current transmit power only with the PH value and without the $P_{CMAX,c}$ value applied by the UE. In the PHR transmission, for each cell, the Type 1 PHR is always transmitted, or for PCells, the Type 2 PHR is always transmitted in addition thereto.

In other words, the UE aggregating a plurality of cells in the LTE system, when transmitting a PHR (power headroom report) in any sub-frame, transmits the PHRs for all the activated cells aggregated by the UE. That is, the UE aggregating a plurality of cells in the LTE system, when transmitting a PHR to the base station in any sub-frame, transmits the PHRs for all the activated cells aggregated by the UE.

However, in case the UE aggregates TDD cells having different U/D configurations, some cells may have been set to U while others have been set to D in the same sub-frame. In such case, the definition of UL PHR may be rendered ambiguous. In other words, the power headroom report as shown in FIG. 7 does not consider U/D configurations and configures such a type of MAC message as includes both the PH and the Pcmax,c for all aggregated serving cells.

Thus, disclosed herein is a UL PHR transmission scheme for efficiently using uplink resources according to predetermined definitions while clarifying the definition of UL PHR.

Figure 8:
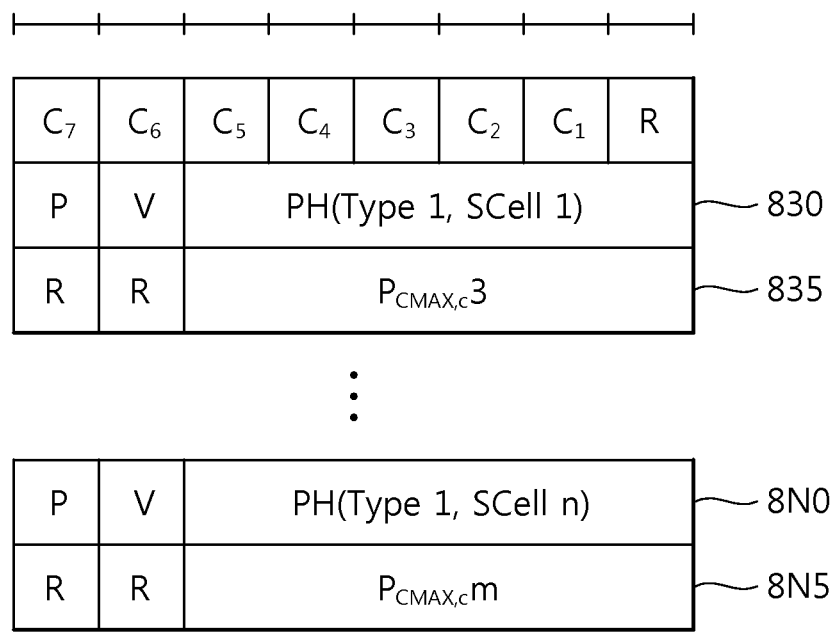
FIG. 8 illustrates an example of an MAC CE for power reporting according to an embodiment of the present invention.

FIG. 8 illustrates an example of an MAC CE for power reporting according to an embodiment of the present invention. Proposed herein is a transmission scheme by the UE in which upon transmission of a PHR in a sub-frame, the UE configures and transmits PHRs for activated cells set to UL without transmitting PHRs for cells set to DL in the sub-frame.

Referring to FIG. 8, the UE configures and transmits a PHR for a corresponding serving cell only when set to UL in a corresponding sub-frame. That is, the UE configures a PHR to include PH (power headroom) values 830, . . . , 8N0 obtained by subtraction of the transmit power to be applied if PUSCH is applied to activated serving cell(s) to the UL and the Pcmax,c values 835, . . . , 8N5 in the corresponding serving cells.

In other words, the UE, in case the PCell is set to DL in the corresponding sub-frame, configures the PHR excluding the PHR for the PCell. Or, the UE always transmits a PHR for the PCell where UL transmission is relatively frequent, and for the remaining secondary serving cells, the UE configures a PHR to include the PHs and Pcmax,c values only for the secondary serving cells always set to UL and transmits the configured PHR.

Accordingly, the UE may reduce the burden of PHR overhead that comes from the cells where UL transmission is not actually performed. In other words, the UE, by the DL configuration, may be free from computation and other operations for configuring PHRs for the cells where UL transmission is not conducted, thus reducing time and complexity. Therefore, the efficiency of other UL data transmission may be increased.

Figure 9:
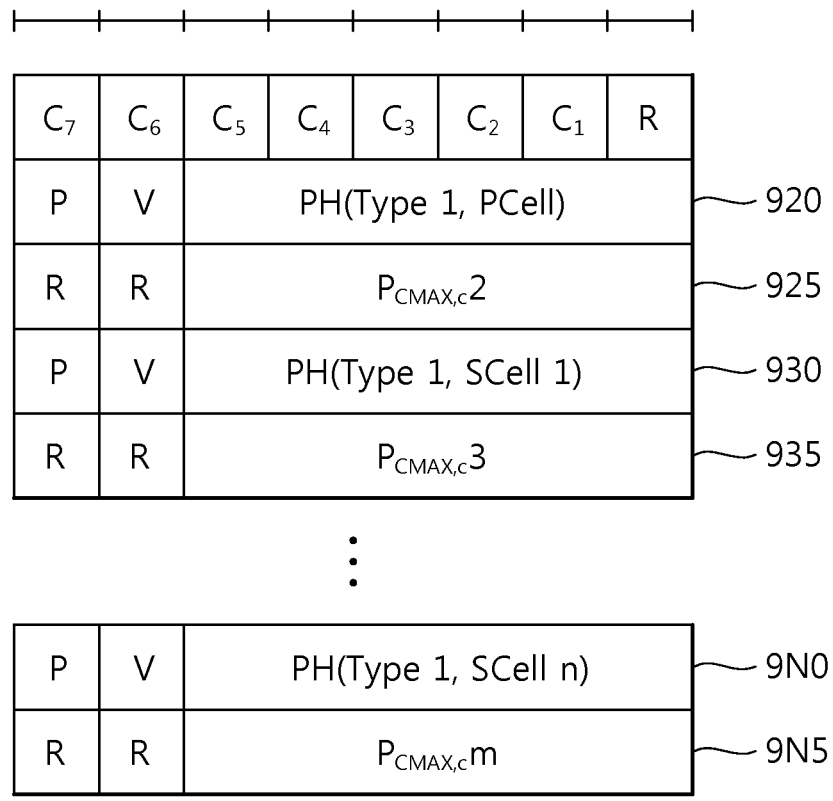
FIG. 9 illustrates an example of an MAC CE for power reporting according to another embodiment of the present invention.

FIG. 9 illustrates an example of an MAC CE for power reporting according to another embodiment of the present invention.

Referring to FIG. 9, even when the UE is configured to transmit Type 1 PHR and Type 2 PHR both for PCell, if, upon transmission of a PHR for PCell in a sub-frame, the PCell is set to DL in the sub-frame, the UE configures PHRs to include only Type 1 PHR 920, 925 for the PCell and transmits the configured PHRs. That is, Type 2 PHR for PCell is excluded from configuring a PHR.

This is why the PCell does not transmit a PUCCH in the DL sub-frame and thus PH information considering actually PUCCH transmission that has low accuracy is excluded from being transmitted to thus ease the burden of PHR overhead, leading to an increased transmission efficiency of other UL data.

Accordingly, if the PCell is set to DL in the sub-frame, the UE does not transmit Pcmax,c (Pcmax,c1) considering PUCCH transmission and Type 2 PH. In other words, in the example shown in FIG. 9, a PHR is configured and transmitted which includes Type 1 PH 920 and Pcmax,c2 925 considering only transmission of PUSCH of the PCell excluding PUCCH transmission of the PCell according to the DL configuration of the PCell in any sub-frame and Type 1 PHR 930, 935, ..., 9N0, 9N5 for activated secondary serving cells set to UL.

Figure 10:
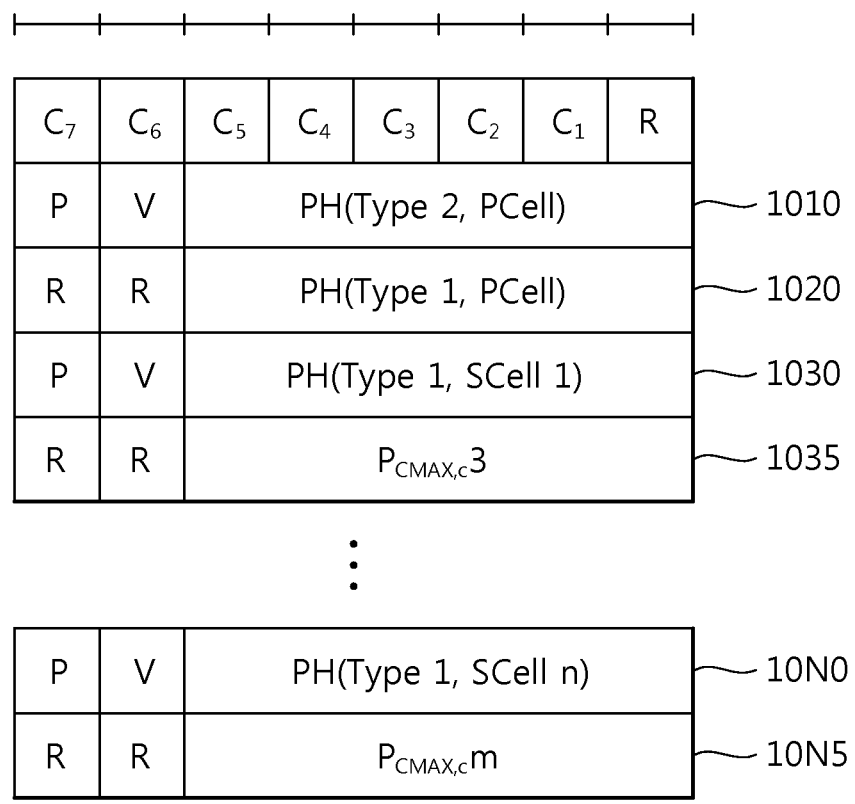
FIG. 10 illustrates an example of an MAC CE for power reporting according to still another embodiment of the present invention.

FIG. 10 illustrates an example of an MAC CE for power reporting according to still another embodiment of the present invention.

Referring to FIG. 10, proposed is a scheme in which the UE configures and transmits a PHR excluding Pcmax,C values for serving cells set to DL in a corresponding sub-frame when sending out a PHR in the sub-frame.

In the case of MAC messages for PHRs in current LTE systems, one-bit field informing whether to transmit a Pcmax,c value and a six-bit field corresponding to the Pcmax,c value are always transmitted. However, according to the present invention, a PHR is configured to exclude the six-bit Pcmax,c field for serving cells set to DL. The reason is why transmission of PUSCH or PUCCH does not occur in DL sub-frame cells that thus apparently do not need Pcmax,c information considering actual PUSCH/PUCCH transmission states. Accordingly, in order to meet the PHR information for properly scheduling the transmit power of the UE while reflecting the circumstance where data transmission does not actually occur and to optimize other signaling, corresponding information is not transmitted for cells where uplink transmission is not actually conducted. Accordingly, the burden of PHR overhead may be reduced while increasing transmission efficiency of other UL data.

That is, if the PCell is set to DL in the corresponding sub-frame, the UE excludes Pcmax,c (Pcmax,c2) considering PUSCH transmission and Pcmax,c (Pcmax,c1) considering PUCCH transmission, and the UE configures a PHR to include a PH 1010 considering simultaneous transmission of PUSCH and PUCCH for the PCell, a PH 1020 considering PUSCH transmission, and PHs 1030, ..., 10N0 and Pcmax, c's 1035, ..., 10N5 for serving cells set to UL and transmits the configured PHR.

The PHR configuration and transmission described above in connection with FIGS. 8 to 10 may be applicable to the case where the UE aggregates TDD/FDD cells as well as aggregates TDD cells. Further, the PHR configuration and transmission may apply to when transmitting a PHR for a plurality of DL/UR resources on time axis or in other domains as well as when transmitting a PHR for a plurality of DL/UL resources on frequency axis. The DL/UR resources may be configured previously or adaptively dynamically.

Further, the above-described PHR configuration and transmission may allow PHR transmission only when the PCell is a UL sub-frame or only when all the activated cells under TDD (or TDD/FDD) CA circumstance are a UL sub-frame.

Figure 11:
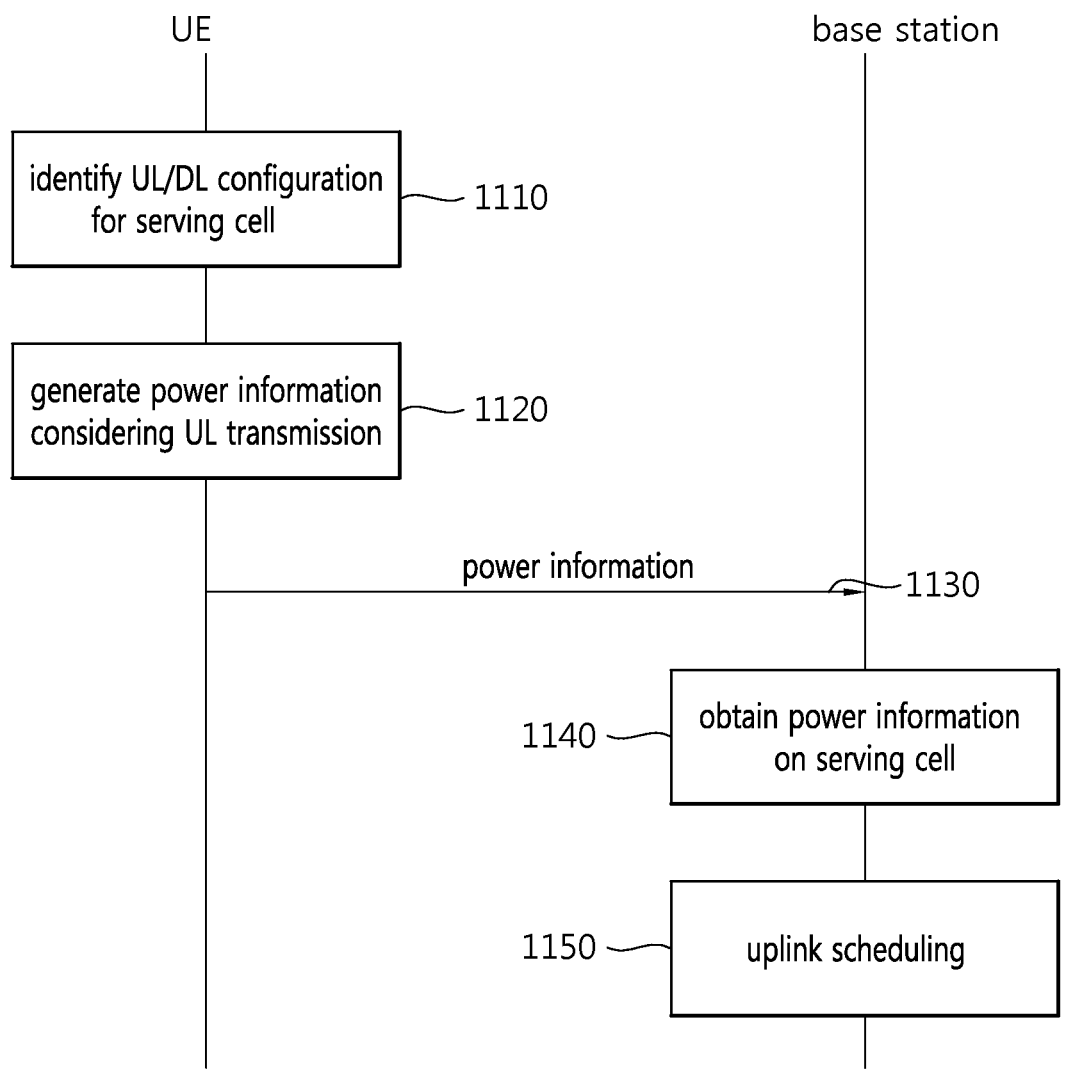
FIG. 11 is a view illustrating a signaling scheme between a user equipment and a base station according to an embodiment of the present invention.

FIG. 11 is a view illustrating a signaling scheme between a user equipment and a base station according to an embodiment of the present invention.

Referring to FIG. 11, the UE identifies UL/DL configurations for serving cells (S1110). The UE identifies the respective sub-frame configurations of the serving cells.

The UE determines respective PHs for the serving cells (S1120). Assume that Pcmax,c is the UE's maximum power configured in sub-frame i. The PH in sub-frame i of serving cell c based on Pcmax,c may be determined as shown in Equation 1. Here, in step S1120, the UE identifies a received UL/DL configuration and configures a PHR considering the UL/DL determined in the corresponding sub-frame. The PHR may contain information regarding PH and Pcmax,c corresponding to the UL configured serving cell in the corresponding sub-frame. Or, the PHR may additionally include information regarding PH and Pcmax,c corresponding to the UL configured serving cell and PH and Pcmax,c considering only transmission of PUSCH of at least PCell for the DL configured PCell, i.e. PH and Pcmax,c of Type 1 PHR.

Or, the PHR may include PH considering PUSCH and PUCCH of Type 2 and PH considering PUSCH of Type 1, excluding Pcmax,c for Type 1 and Pcmax,c for Type 2 for the PCell in the information regarding PH and Pcmax,c corresponding to the UL configured serving cell.

The UE transmits the PHR to the base station (S1130). The PHR transmission is transmitted through an MAC message, for example. Further, the PHR transmission does not exclude transmission through an RRC message. In case the PHR is transmitted through an MAC message, the UE configures an MAC header to have an LCID of 11001 to indicate that the MAC message is a message for PHR.

The base station identifies the power information on the serving cell transmitted from the UE (i.e., the power information is the PH) (S1140). The base station identifies the available transmit power varies depending on the UL/DL configuration made by the UE in a specific sub-frame, and the base station may thus be more exactly aware of the available transmit power that may be used when the UE performs uplink transmission. Accordingly, better link adaptation may be offered to the UE (S1150).

Figure 12:
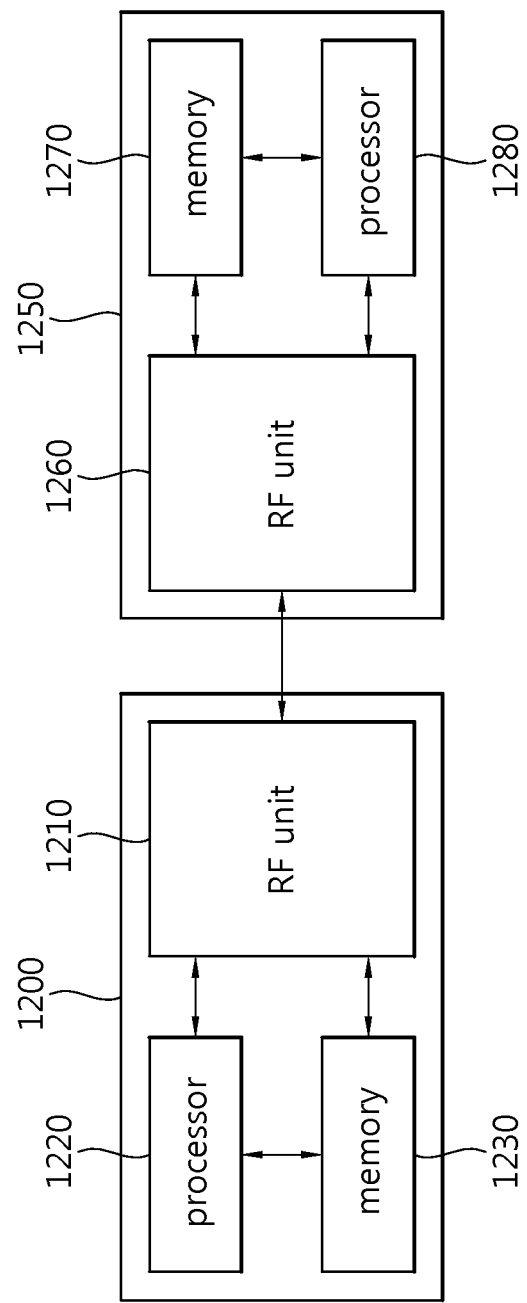
FIG. 12 is a block diagram illustrating the structure of a system in which an embodiment of the present invention is implemented.

FIG. 12 is a block diagram illustrating an apparatus in which an embodiment of the present invention is implemented. The apparatus may be part of the UE.

The apparatus 1200 includes a processor 1220, a memory 1230, and an RF (radio frequency) unit 1210. The memory 1230 is connected with the processor 1220 and stores various types of information for driving the processor 1220. The RF unit 1230 is connected with the processor 1220 and communicates radio signals. The processor 1220 implements functions, processes, and/or methods as proposed herein. The operation of the UE according to the embodiments described above in connection with FIGS. 8 to 11 may be implemented by the processor 1220.

More specifically, the processor 1220 identifies the UL/DL configuration received by the RF unit 1210 and configures a PHR (power headroom report) considering the UL/DL determined in the corresponding sub-frame. The processor 1220 may include a PH computing unit and a message configuring unit for configuring a PHR message.

The PH computing unit of the processor 1220 computes information regarding PH and Pcmax,c corresponding to the UL configured serving cell in the corresponding sub-frame. Or, according to the present invention, the PH computing unit may compute information regarding PH and Pcmax,c corresponding to each of UL/DL configured serving cells. This includes computation of PH and Pcmax,c that belongs to Type 1 PHR, i.e., for DL configured PCell, at least considering transmission of PUSCH of PCell.

The PHR message configuring unit of the processor 1220 may be adapted to configure the PHR to include only information regarding PH and Pcmax,c corresponding to the UL configured serving cell or to further include PH and Pcmax,c that belongs to Type 1 PHR for PCell. Or, the PHR message configuring unit may be adapted to configure the PHR to include PH considering Type 1 PUSCH, PH considering Type 2 PUSCH and PUCCH for PCell in addition to the information regarding PH and Pcmax,c corresponding to UL configured serving cell. This includes being able to configure the PHR excluding Pcmax,c for Type 1 and Pcmax,c for type 2. According to the present invention, the processor configuring the PHR is provided in the UE.

Meanwhile, the above-described processor may be configured in a base station. In such case, it may perform a reverse operation of the UE processor, paired with the UE. As an example, the processor 1280 of the base station may include a PHR message obtaining unit and a scheduler. The PHR message obtaining unit of the process in the base station may identify the value PHR reported from the UE, and the scheduler may more efficiently manage the UE's uplink resources using the identified PHR.

The processor may include an ASIC (application-specific integrated circuit), other chipset, a logic circuit, and/or a data processing device. The memory may include a ROM (Read-Only Memory), a RAM (Random Access Memory), a flash memory, a memory card, a storage medium, and/or other storage device. The RF unit may include a baseband circuit for processing radio signals. When an embodiment is implemented in software, the above-described schemes may be embodied in modules (processes, or functions, etc.) performing the above-described functions. The modules may be stored in the memory and executed by the processor. The memory may be positioned in or outside the processor and may be connected with the processor via various well-known means.

In the above-described example system, the methods are described based on the flowcharts with a series of steps or blocks, but the present invention is not limited to the order of the steps, and rather, some steps may be performed simultaneously or in different order with other steps. It should be appreciated by one of ordinary skill in the art that the steps in the flowcharts do not exclude each other and that other steps may be added to the flowcharts or some of the steps may be deleted from the flowcharts without influencing the scope of the present invention.

What is claimed is:

1. A method for reporting a power headroom (PH) by a user equipment (UE) in a wireless communication system, the method comprising:
    checking whether a first sub-frame for a frame for a first serving cell is used for an uplink (UL) transmission or a downlink (DL) transmission;
    checking whether a second sub-frame for a second serving cell is used for the UL transmission or the DL transmission, wherein the first sub-frame for the first serving cell and the second sub-frame for the second serving cell are transmitted at a same time;
    if the first sub-frame for the first serving cell is used for the DL transmission and the second sub-frame for the second serving cell is used for the UL transmission, configuring a power headroom report (PHR), wherein the PHR does not include a first power headroom (PH) field, which is used for simultaneous transmission on a physical uplink shared channel (PUSCH) and a physical uplink control channel (PUCCH), for the first serving cell, wherein the PHR does not include a maximum transmit power of the UE, which is used for transmission on the PUCCH, for the first serving cell, wherein the PHR includes a second PH field, which is used for transmission on the PUSCH, for the first serving cell, and wherein the PHR includes a third PH field, which is used for a transmission on the PUSCH, for the second serving cell; and
    transmitting the PHR to a base station.

2. The method of claim 1, wherein the uplink transmissions and the downlink transmissions of the first sub-frame for the first serving cell and the second sub-frame for the second serving cell are different depending on time division duplex schemes.

3. The method of claim 1, wherein the first serving cell is a primary serving cell (PCell), and
    wherein the second serving cell is a secondary serving cell (SCell).

4. The method of claim 1, wherein the PHR further includes a maximum transmit power of the UE, which is used for the transmission on the PUSCH, for the first serving cell and a maximum transmit power of the UE for the second serving cell.

5. An apparatus for reporting a power headroom (PH) in a wireless communication system, the apparatus comprising:
    a radio frequency (RF) unit configured to transmit and receive a radio signal; and
    a processor connected with the RF unit, the processor being configured to:
        check whether a first sub-frame for a first serving cell is used for an uplink (UL) transmission or a downlink (DL) transmission,
        check whether a second sub-frame for a second serving cell is used for the UL transmission or the DL transmission, wherein the first sub-frame for the first serving cell and the second sub-frame for the second serving cell are transmitted at a same time,
        if the first sub-frame for the first serving cell is used for the DL transmission and the second sub-frame for the second serving cell is used for the UL transmission, configured a power headroom report (PHR), wherein the PHR does not include a first power headroom (PH) field, which is used for simultaneous transmission on a physical uplink shared channel (PUSCH) and a physical uplink control channel (PUCCH), for the first serving cell, wherein the PHR does not include a maximum transmit power of the UE, which is used for transmission on the PUCCH, for the first serving cell, wherein the PHR includes a second PH field, which is used for transmission on the PUSCH, for the first serving cell, and wherein the PHR includes a third PH field, which is used for a transmission on the PUSCH, for the second serving cell, and
        transmit the PHR to a base station.

6. The apparatus of claim 5, wherein the uplink transmissions and the downlink transmissions of the first sub-frame for the first serving cell and the second sub-frame for the second serving cell are different depending on time division duplex schemes.

7. The apparatus of claim 5, wherein the first serving cell is a primary serving cell (PCell), and
    wherein the second serving cell is a secondary serving cell (SCell).

8. The apparatus of claim 5, wherein the PHR further includes a maximum transmit power of the UE, which is used for the transmission on the PUSCH, for the first serving cell and a maximum transmit power of the UE for the second serving cell.

* * * * *